FIG. 2
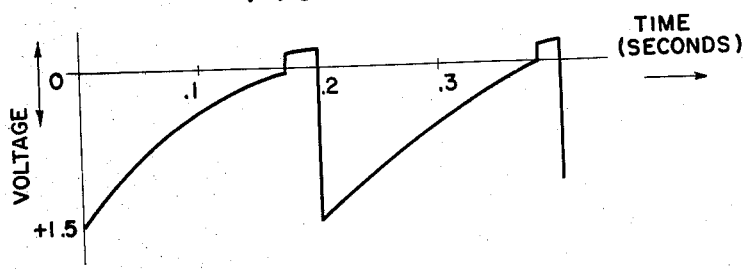
FIG. 3
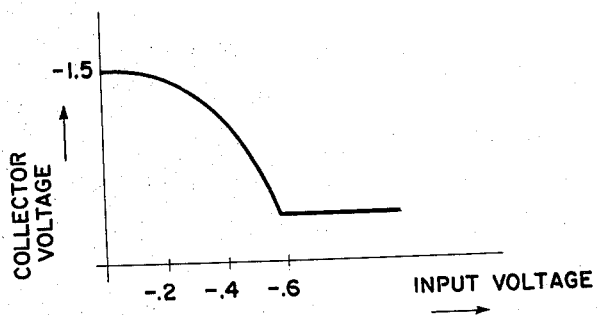
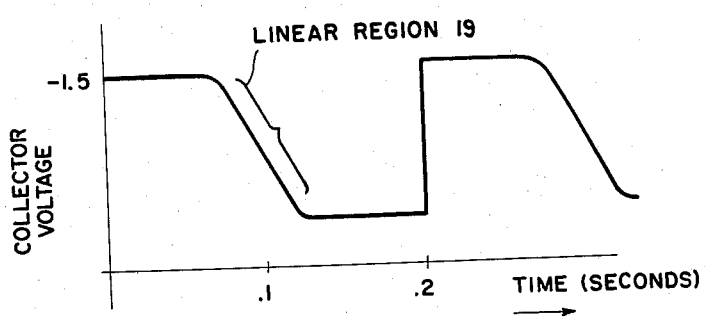
FIG. 4

July 12, 1966  P. LAAKMANN  3,260,991
APPARATUS FOR DETECTING MOTION AND OBJECTS
Filed March 20, 1963  3 Sheets-Sheet 3
FIG. 5
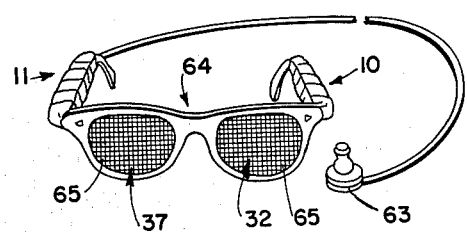
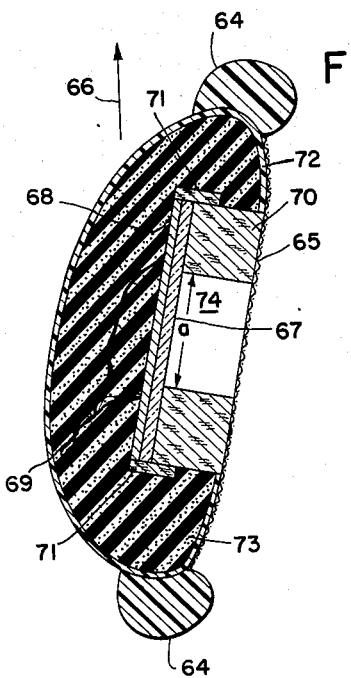
FIG. 6
FIG. 7
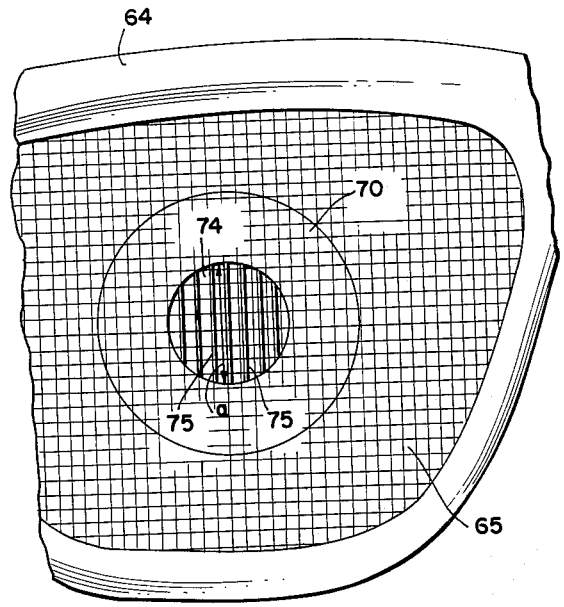

United States Patent Office 3,260,991
Patented July 12, 1966

3,260,991
APPARATUS FOR DETECTING MOTION
AND OBJECTS
Peter Laakmann, Fort Lee, N.J., assignor to American District Telegraph Company, Jersey City, N.J., a corporation of New Jersey
Filed Mar. 20, 1963, Ser. No. 266,573
7 Claims. (Cl. 340—15)

The present invention relates to the detection of motion and objects and more particularly to a method and apparatus for detecting motion and objects in a limited space through the use of acoustic energy.

Various systems have been developed for the use of acoustic energy in the detection of motion and objects. Examples of such systems are the ultrasonic systems described in United States Patents Nos. 2,655,645 to Bagno, 2,972,133 to MacDonald, issued October 13, 1953 and February 14, 1961, respectively. Other examples are the Sonar systems which have been used widely for underwater detection.

A typical conventional frequency modulated Sonar system employs a periodically linearly frequency modulated signal, e.g., an oscillator frequency modulated with a saw tooth signal. The modulated carrier is supplied to a directional transducer and the resultant acoustic energy is transmitted in a selected direction. Acoustic energy reflected from an object in the path of the transmitted energy is received in a receiving transducer and the received signal is supplied, together with the modulated carrier, to a mixer circuit to obtain the difference frequency between the reflected signal and the instantaneous transmitted signal. The difference frequency depends on the range to the target due to the time delay inherent in the acoustical path. For example, if the transmitted signal changes linearly at the rate of 100 cycles per second per millisecond (c.p.s./ms.) and the propagation velocity is 1000 feet per second, the difference frequency will be 200 cycles per second per foot of target range.

Systems of the type described have been highly developed and have been used to good advantage. However, by reason primarily of size, power requirements and operating characteristics they have not been suitable for portable applications and other uses which require light weight, low power drain and high efficiency equipment, e.g., personal guidance systems such as may be used to assist blind persons.

The principal object of the present invention has been the provision of a novel and improved method and apparatus for detecting motion and objects.

More particularly it has been an object of the invention to provide such a method and apparatus which is especially adapted for portable use.

Another object of the invention has been the provision of such a method and apparatus especially adapted for the detection of motion and objects at short ranges.

An important use of the invention is in providing guidance for blind persons and hence an object of the invention has been the provision of a novel and improved guidance device for blind persons which can be worn conveniently, which is reliable in operation and which requires little operating power.

Other and further objects, features and advantages of the invention will appear more fully from the following description of the invention taken in connection with the appended drawings, in which:

FIG. 2 is a curve showing the saw tooth multivibrator voltage wave form for the circuit of FIG. 1;

FIG. 3 is a curve showing the transfer characteristics of a transistor amplifier connected to the saw tooth multivibrator in the circuit of FIG. 1;

FIG. 4 is a curve showing the multivibrator voltage wave form of FIG. 2 corrected by the transistor of FIG. 3;

FIG. 5 is a perspective view illustrating a guidance device embodying the invention;

FIG. 6 is a longitudinal sectional view through the device of FIG. 5; and

FIG. 7 is a partial front view of the device of FIG. 6.

Figure 1:
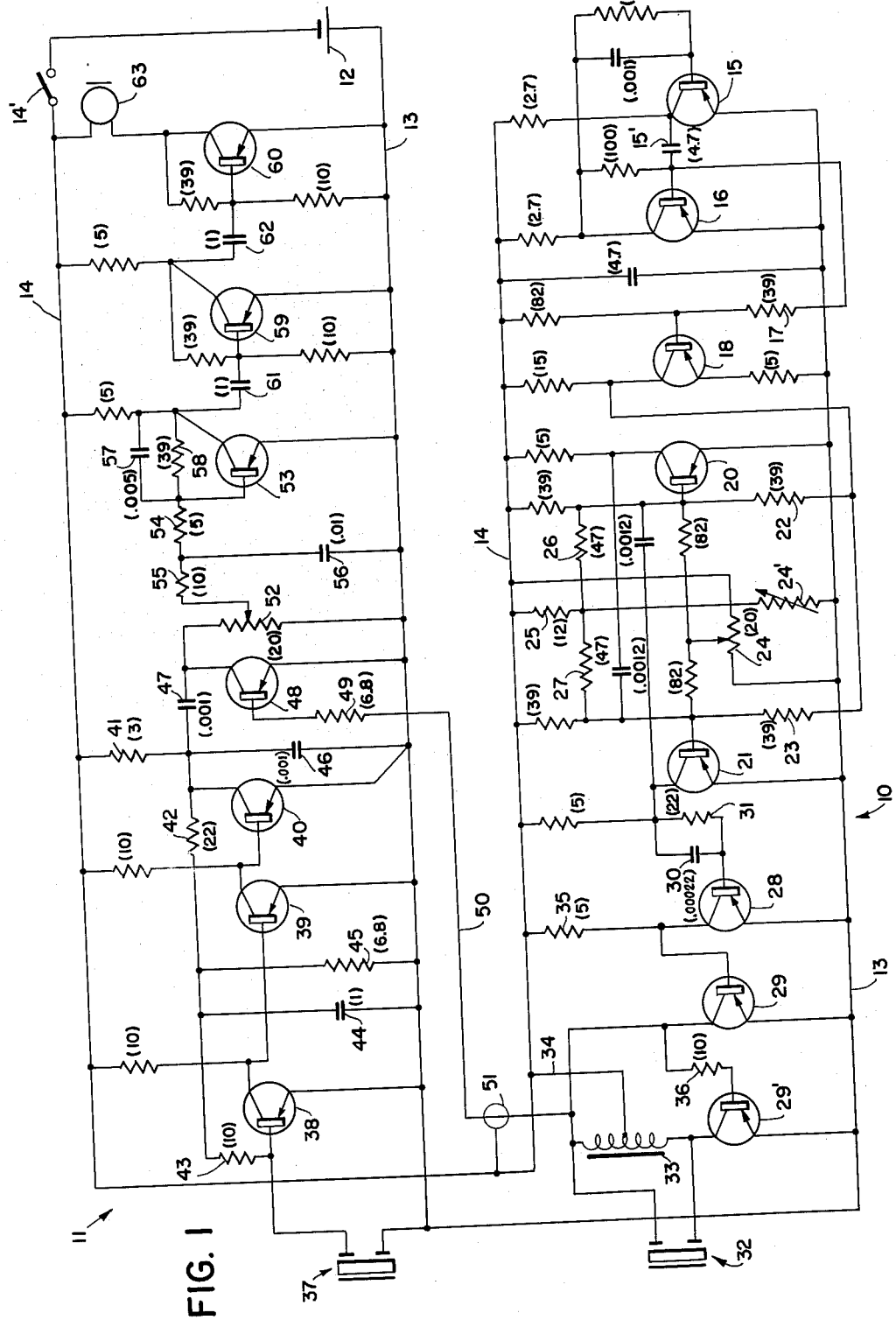
FIG. 1 is a circuit diagram illustrating one embodiment of the invention.

The invention will be described principally in connection with a guidance device. However, it should be understood that the principles of the invention are applicable to other devices, e.g., detectors for detecting the presence and/or motion of an intruder in a protected space. For this latter application the invention offers an important advantage over systems of the type described in the aforementioned Bagno and MacDonald patents in that the presence of an intruder (as distinguished from his relative motion) can be detected and hence the intruder can not avoid detection by very slow motion.

Referring now to the drawings and more particularly to FIG. 1, the system of the invention comprises a transmitting unit 10 shown generally in the lower part of the figure and a receiving unit 11 shown generally in the upper part of the figure. The power source for the system is a battery 12 having a positive terminal connected to a positive bus 13 and a negative terminal connected to a negative bus 14 through a switch 14'.

The transmitting unit is provided with a saw tooth generator comprising transistors 15 and 16 connected as an astable multivibrator. All the transistors of FIG. 1 may be of any suitable type, e.g., of the 2N2401 type. The saw tooth output of the astable multivibrator 15, 16 is derived from discharge of a capacitor 15' coupled between the base of transistor 16 and the collector of transistor 15, and is supplied through a resistor 17 to the base of a transistor 18.

The wave form of the voltage output of multivibrator 15, 16 is shown in FIG. 2 from which it will appear that the voltage wave form is a saw tooth signal having a period of 0.2 second or a frequency of 5 cycles per second. More specifically, since the output of multivibrator 15, 16 is a capacitor discharge, the voltage wave form shown in FIG. 2 is a negatively increasing exponential function.

Transistor 18 acts as an inverting amplifier and is used to restore linearity. The transfer characteristic (collector voltage vs. input voltage) of transistor 18 is shown in FIG. 3. Since the transfer characteristic of transistor 18 is a positively increasing exponential function while the applied voltage from multivibrator 15, 16 is a negatively increasing exponential function, by proper choice of the emitter resistance of transistor 18 these exponential functions can be made equal over a limited range of signal, resulting in a voltage at the collector of transistor 18 which is a linear function of time over a considerable portion of the sweep cycle. The wave form of the collector voltage of transistor 18 with an input voltage as shown in FIG. 2 is illustrated in FIG. 4. In FIG. 4 the linear region is shown at 19.

The frequency of 5 cycles per second referred to for multivibrator 15, 16 and other specific values referred to herein are given by way of example only and should not be considered as limiting the invention. Similarly, the component values shown in FIG. 1 are given only by way of example. The values of resistors are in thousands of ohms and the values of capacitors are in microfarads.

Transistors 20 and 21 are coupled in another astable multivibrator which is the main oscillator of the system and is designed to operate in the region of the nominal system operating frequency, e.g., 40,000 cycles per second. The actual frequency of operation of multivibrator 20, 21 is varied linearly with time by applying the inverted output of the saw tooth generator 15, 16 to the bases of transistors 20, 21. For this purpose, the collector of transistor 18 is coupled to the base of transistor 20 through a resistor 22 and to the base of transistor 21 through a resistor 23. The nominal operating frequency of the multivibrator 20, 21 can be adjusted by means of a variable resistor 24. Temperature compensation is provided by a resistor 24' which is of the temperature variable type. Resistor 24' and resistor 25 are connected as a voltage divider between busses 13 and 14. The junction of resistors 24 and 25 is coupled to the base of transistor 20 through a resistor 26 and to the base of transistor 21 through a resistor 27. Hence a change in value of resistor 24' will alter the bias voltages at the bases of transistors 20 and 21 to compensate for temperature changes.

The instantaneous operating frequency of multivibrator 20, 21 is a linear function of the voltage applied to the bases of transistors 20 and 21 and hence will be a linear function of time over more than 80% of the frequency sweep.

In effect the multivibrator 20, 21 is frequency modulated by the inverted output of the saw tooth generator. Typically the frequency output of multivibrator 20, 21 will be swept downwardly from 41 kc. to 37 kc. at a repetitive rate of 5 cycles per second. Over 80% of the frequency sweep will be a linear function of time since the corresponding output voltage wave form of transistor 18 is linear, as shown in FIG. 4. While the transfer characteristic of transistor 18 is temperature sensitive, temperature affects the linearity only to a small extent. Thus changes in temperature will cause the base to emitter voltage of transistor 18 to vary for a given collector current, but this will merely cause the linearly increasing portion of the voltage wave form at the collector of transistor 18 to shift to the right or left (FIG. 4) depending on temperature. But such a change will not affect sweep rate or total sweep. As explained above, resistor 24' affords temperature compensation for the multivibrator circuit 20, 21.

The output signal of multivibrator 20, 21 is supplied to an isolating amplifier 28, the output of which is supplied to a push-pull amplifier comprising transistors 29 and 29'. The oscillator output is supplied from the collector of transistor 21 to the base of transistor 28 through parallel connected capacitor 30 and resistor 31.

The amplified output of transistors 29 and 29' is supplied to a transmitting transducer 32 which might be a barium titanate crystal transducer designed to resonate at 40 kc. and having a very narrow bandwith, e.g., 400 cycles per second (to the ½ power point). To achieve a minimum power consumption the transducer 32 will usually not be provided with additional damping but will operate essentially at its natural damping rate in air. It is desirable that the crystal be mounted to operate in the butterfly mode. Details of a preferred transducer design are described hereinafter. Typically the power output of transducer 32 might be one milliwatt at 40 kc.

The output of push-pull amplifier 29–29' is applied to transducer 32 through ferrite core coil 33, the collectors of transistors 29 and 29' being connected to respective ends of coil 33. Typically, coil 33 might be wound with 400 turns of #45 wire on a 12 mm. ferrite cup. The coil 33 and the capacitance of transducer 32 form a parallel resonant circuit at the nominal operating frequency, e.g., 40 kc. Collector operating potentials for transistors 29 and 29' are supplied by a connection 34 from conductor 14 to a center tap of coil 33. Base bias voltages for transistors 29 and 29' are derived from negative bus 14 through a resistor 35 and through coil 33 and a resistor 36, respectively.

Acoustic energy transmitted by transducer 32 and reflected back by an object in the nearby space is received by a transducer 37 which may be identical with transducer 32.

One terminal of transducer 37 is connected to positive bus 13, while the other terminal thereof is connected to the base of a transistor 38 forming the first stage of a three-stage preamplifier comprising transistor 38 and transistors 39 and 40. The collector of transistor 38 is directly connected to the base of transistor 39, while the collector of transistor 39 is directly connected to the base of transistor 40. A capacitor 47 is connected between the colletcor of transistor 40 and the emitter of a transistor 48. Capacitor 47 allows the amplified high frequency signal output of transistor 40 to be applied to the collector of transistor 48, but blocks D.C. potential from this electrode. Hence, transistor 48 operates as a variable resistance device without supply voltage. The base of transistor 48 is coupled to one end of coil 33 through a resistor 49 and a shielded conductor 50, the shielding of which is indicated by the loop 51 connected to bus 14.

Conductor 50 and resistor 49 serve to apply a portion of the oscillator output energy to transistor 48. The latter acts as a mixer to mix the transmitted signal derived from coil 33 with the received signal derived from transistor 40. The resultant mixed signal appears across a potentiometer 52 connected between the collector and emitter electrodes of transistor 48.

The oscillator output energy supplied to the base of transistor 48 overdrives the base of transistor 48 so that transistor 48 conducts for one half cycle and is non-conductive for the other half cycle of the oscillator sine wave output. Since transistor 48 is operated without supply voltage, no voltage will appear at the collector thereof in the absence of a signal from receiving transducer 37. However, when a received signal appears at the collector of transistor 48, the transistor 48 will conduct on alternate half cycles so that the mixed output will appear across potentiometer 52. The amplitude of the signal across potentiometer 52 is proportional to the strength of the signal voltage applied to the collector of transistor 48. The mixer stage 48 has been found to have a voltage conversion efficiency of over 70% which is highly desirable since the received energy supplied to the mixer is very small compared to the oscillator energy supplied thereto.

The slider of potentiometer 52 is coupled to the base of a transistor 53 through series connected resistors 54 and 55. A capacitor 56 is connected between the junction of resistors 54 and 55 and bus 13. Resistors 54 and 55 and capacitor 56 act as a low pass filter which permits the difference frequency components to appear at the base of transistor 53 but which blocks the high frequency components (carrier and sum frequency). A capacitor 57 is connected across base bias resistor 58 which is connected between the base and collector electrodes of transistor 53. Capacitor 57 acts to prevent high frequency components from appearing in the base-collector circuit of transistor 53.

Transistor 53 is the first stage of a three stage intermediate frequency amplifier. In the present case the intermediate frequency is in the audio range and hence this amplifier is an audio amplifier. The other two stages comprise transistors 59 and 60.

The amplified output at the colletcor of transistor 53 is supplied to the base of transistor 59 through a capacitor 61 while the amplified output at the collector of transistor 59 is supplied to the base of transistor 60 through a capacitor 62. The amplified output of transistor 60 is supplied to an ear phone or other sound reproducing device 63 connected between the collector of transistor 60 and negative bus 14.

A particularly desirable physical embodiment of the circuit of FIG. 1 is shown in FIG. 5. FIG. 5 shows an ordinary spectacle frame 64 with the transmitting circuit 10 mounted on one ear piece and the receiving circuit 11 mounted on the other ear piece. The transmitting transducer 32 is mounted in place of one glass lens and the receiving transducer 37 is mounted in place of the other glass lens.

Typical transducer construction and mounting is illustrated in FIGS. 6 and 7 which are a longitudinal cross sectional view and a front view, respectively, of either of the transducers mounted as shown in FIG. 5. The fronts of the spectacle frame lens openings are covered with protective screens 65 and are mounted at an inclination to the vertical as shown by vertical arrow 66.

The transducer crystal element is shown at 67 and its conductive backing at 68. The wires for delivering energy or receiving energy are shown at 69. The crystal and backing are mounted on an annular cork block 70 and are held in place by spaced cork lugs 71. The block 70 and the crystal and backing are mounted in a corresponding circular hole in a hollow plastic member 72 which might, for example, be Bakelite. The space within the member 72 is filled with a resilient sound absorbing material 73, e.g., sponge rubber. Acoustic energy enters or leaves the transducer through central hole 74 in annular block 70. As shown in FIG. 7, a series of vertically disposed strips 75 are mounted across hole 74 beneath screen 65. The strips 75 might be made of impregnated or otherwise stiffened paper.

The difference frequency supplied to earphone 63 is an audio frequency dependent on the target distance. For example, if the transmitted acoustic signal frequency changes linearly at the rate of 100 cycles per second per millisecond and the propagation velocity of sound is 1000 feet per second (the approximate value in air), the difference frequency will be 200 cycles per second per foot of target range. Hence acoustic energy returned from a target 10 feet away will produce a difference frequency of 2000 cycles If the rate of change of the transmitted signal frequency is 50 cycles per second per millisecond, the difference frequency will be 100 cycles per second per foot of target range. Under this condition, a difference frequency of 2000 cycles represents a target range of 20 feet while a difference frequency of 500 cycles represents a target range of 5 feet. The rate of change of transmitted frequency is dependent on the slope of the linear region 19 of the curve of FIG. 4 since it is the corresponding rate of change of the voltage at the bases of transistors 20 and 21 which determines the rate of change of output frequency of multivibrator 20, 21.

For the purposes of providing a guidance device for blind people it has been found desirable to provide range information from zero to twenty feet with an audio tone varying between zero and 2000 cycles. The total frequency sweep for this purpose must exceed 2 kc. and it has been found desirable to use a sweep of 4 kc., e.g., the sweep from 41 kc. to 37 kc. described previously. A nominal operating frequency in the area of 40 kc. has been found desirable as a compromise between the difficulty of directional control of low frequency acoustic energy and the rapid increase in attenuation of acoustic energy in air at higher frequencies.

The transducers 32 and 37 are both made resonant at the nominal operating frequency, e.g., 40 kc. Since the transducer band widths are narrow, e.g., 400 cycles (to the ½ power point), there will be no appreciable acoustic transmission near the high or low ends of the oscillator range. Thus by providing a relatively fast retrace (as shown by the almost vertical portion of the curve in FIG. 4), blanking is automatically achieved without the necessity for providing a blanking circuit to disable the receiver during and after the retrace period. By a relatively fast retrace is meant that the sweep returns to its starting point faster than the response time of the transducer. It is important that the sweep retrace be initiated outside the transducer pass band and terminate outside the pass band. In FIG. 4 the retrace commences at 37 kc. and terminates at 41 kc., both of which are well outside the pass band of 400 cycles centered at 40 kc. Without blanking action spurious signals and beats will appear in the audio signal supplied to the earphone.

The transducers are preferably designed to have a band width lying in the range of about 1 to 2% of the resonant frequency thereof, but satisfactory operation can be achieved with a band width up to about 5% of the resonant frequency. The band width should be small as compared to the total sweep, e.g., 400–800 cycles out of a total sweep of 4000 cycles. The transducer band width should not exceed 50% of the total sweep and is preferably much less, e.g., 10 to 20%.

The audible difference frequencies resulting from application of a swept frequency to a narrow band transducer are pulses of audio frequency whose pitches are a function of target range. In a noisy acoustical environment, e.g., a typical city street, such pulses are easier to interpret and distinguish than a more or less continuous audio tone. Another advantage which flows from swept frequency operation of narrow band transducers is that target echoes will be spaced in time as well as in frequency, making it easier to recognize low frequency and high frequency echoes simultaneously. Such echoes would result from a near and a far reflection such as a near curb and a far building wall.

Since the audible difference frequency is proportional to the rate of change of the transmitted frequency, it is important that the rate of change of oscillator frequency with time $(df/dt)$ be linear. Swept frequency operation of narrow band transducers makes the requisite linearity easier to achieve since the band width is small compared to the total sweep. This is of particular importance where space and power limitations impel the use of relatively simple circuits. In the circuit of FIG. 1 the requisite linearity is achieved by providing the astable multivibrator 15, 16 which is asymmetrical in design to generate a voltage (FIG. 2) which increases linearly at a decreasing rate, and applying the voltage to the transistor amplifier 18 having a bias point and emitter resistance selected to provide an exponential transfer characteristic which provides increasing amplification for increasing base voltage, thus compensating for the non-linearity in the output of multivibrator 15, 16.

It has been found desirable for the operating frequency to be swept downward rather than upward so that Doppler frequency shifts resulting from motion of the transducers toward the target or of the target toward the transducers are additive to the difference frequency resulting from target range. With an upward sweep, under some circumstances of range and motion toward a target, no audible signal would be heard.

For the purposes of a guidance device it is desirable that the transmitting and receiving transducers be highly directional. It has been found that optimum results are achieved with an included horizontal angle (to the ½ power point) of about 20° where the transducers are mounted as shown in FIG. 5. The included vertical angle, on the other hand, is preferably 90° or more with at least about 70° of the included vertical angle being below the horizontal.

Limitation of the included vertical angle is achieved in the FIG. 6 arrangement by spacing the crystal 67 away from the mouth of circular hole 74 and by mounting the crystal and support at a downward inclination to the vertical, as shown. Limitation of the included horizontal angle is achieved by providing the vertical strips 75 in the hole 74. The presence of vertical strips 75 limits the angle of divergence of the acoustic energy in a horizontal plane to a selected value much less than the corresponding angle in the vertical plane.

When the invention is applied to detecting the presence of an intruder in a protected place or zone, the transmitting transducer is arranged to transmit energy into the zone and the receiving transducer is arranged to receive energy reflected from objects in the zone. For a typical operation the frequency sweep rate is adjusted with respect to the transducer band widths so that if there is no reflecting object in the zone, no appreciable voltage will appear at the collector of transistor 48. Should an object such as a person enter the zone, reflection would produce a voltage at the collector of transistor 48 which would result in an audio frequency output at the collector of transistor 60. Such output could be used to provide an alarm, as by energizing a relay or power transistor connected to an alarm signalling device. It will be observed that a reflected signal will be received even though a person entering the zone were to move so slowly as to produce no appreciable Doppler shift. Of course, substantial motion of the intruder toward the receiving transducer would result in a Doppler shift tending to aid detection. This aspect of the invention is especially suited to providing a fence or barrier across an otherwise open space such as an entrance area to a large room.

While the invention has been described in connection with specific embodiments thereof and in specific uses, various modifications thereof will occur to those skilled in the art without departing from the spirit and scope of the invention as set forth in the appended claims.

What is claimed is:

1. Apparatus for detecting objects in a selected zone for producing an audible tone distinctly representative of the range of said object, comprising a spectacle frame having a pair of lens spaces, a source of alternating current, means periodically to frequency modulate said alternating current to produce a first signal which periodically sweeps downwardly in frequency over a selected range at a relatively slow rate and then returns at a relatively rapid rate, a transmitting transducer and a receiving transducer each exposed to said zone and each having a like resonant frequency corresponding to an intermediate frequency value in said selected range and each having an effective bandwidth substantially less than any frequency in said range and substantially less than the extent of said range, the frequency passband of said transmitting transducer being remote from the terminal frequencies of said range and the response time of said transmitting transducer being slow relative to said return time of said sweep, said transducers each being mounted in a respective one of said lens spaces, means to apply said first signal to said transmitting transducer to convert the same to acoustic energy, a portion of said acoustic energy transmitted into said zone and being reflected from an object in said zone being converted into a second signal by said receiving transducer, means to mix said first and second signals to produce a mixed signal having a difference frequency component in the audio range, a sound reproducing device, and amplifying means intercoupling said mixer and said sound reproducing means to apply the difference frequency components of said mixed signal to said sound reproducing means.

2. Apparatus as set forth in claim 1 in which said transducers have directional characteristics in both vertical and horizontal planes.

3. Apparatus as set forth in claim 2 in which said transducers transmit forwardly with an included horizontal angle of about 20° and an included vertical angle of not less than about 90°, at least about 70° of said included vertical angle being below the horizontal.

4. Apparatus for detecting objects in a selected zone and for producing an audible tone distinctly representative of the range to said object, comprising a first astable multivibrator having an output frequency substantially linearly variable with applied voltage over a selected range of ultrasonic frequencies, a second astable multivibrator having an output frequency of a few cycles per second and an output voltage wave form which is a negatively increasing exponential function followed by a rapid retrace, a first amplifier circuit having an input coupled to the output circuit of said second multivibrator and having a voltage transfer characteristic which is a positively increasing exponential function selected to make the output voltage wave form of said first amplifier substantially linear over a major portion of the output range of said first amplifier, means to apply the output of said first amplifier to said first multivibrator periodically to sweep the output frequency of said first multivibrator downwardly over said selected range at a repetition rate equal to the frequency of said second multivibrator, said retrace returning the frequency of said first multivibrator to the upper value thereof after each downward sweep, a transmitting transducer exposed to said zone and having a resonant frequency intermediate the upper and lower limits of said selected range, said transmitting transducer having a bandwidth less than about 50% of the extent of said selected range, said resonant frequency of said transmitting transducer being selected relative to said bandwidth thereof so that said transmitting transducer will not respond appreciably to the frequencies adjacent the upper and lower limits of said selected range, said transmitting transducer having a response time large relative to the frequency return time of said first multivibrator, means to apply the output of said first multivibrator to said transmitting transducer to produce corresponding acoustic energy in said zone, a receiving transducer exposed to said zone, a portion of said acoustic energy transmitted into said zone being reflected from an object in said zone and being converted into a received signal by said receiving transducer, a mixer circuit, means to apply a portion of the output of said first multivibrator to said mixer circuit, means to apply said received signal to said mixer circuit, means to derive a mixed frequency output from said mixer circuit, means to suppress frequency components in said mixed frequency output other than the difference frequency between said portion and said received signal, means to amplify said difference frequency components, sound reproducing means, and means to apply said amplified difference frequency components to said sound reproducing means.

5. Apparatus for detecting objects in a selected zone and for producing an audible tone distinctly representative of the range to said object, comprising a first astable multivibrator having an output frequency substantially linearly variable with applied voltage over a selected range of ultrasonic frequencies, a second astable multivibrator having an output frequency of a few cycles per second and an output voltage wave form which increases linearly at a decreasing rate followed by a rapid retrace, a first amplifier circuit having an input coupled to the output circuit of said second multivibrator and having a voltage transfer characteristic which provides increasing amplification for increasing input voltage to make the output voltage wave form of said first amplifier substantially linear over a major portion of the output range of said first amplifier, means to apply the output of said first amplifier to said first multivibrator periodically to sweep the output frequency of said first multivibrator downwardly over said selected range at a repetition rate equal to the frequency of said second multivibrator, said retrace returning the frequency of said first multivibrator to the upper value thereof after each downward sweep, a transmitting transducer exposed to said zone and having a resonant frequency intermediate the upper and lower limits of said selected range, said transmitting transducer having a bandwidth equal to about 10 to 20% of the extent of said selected range, said resonant frequency of said transmitting transducer being selected relative to said bandwidth thereof so that said transmitting transducer will not respond appreciably to the frequencies at the upper and lower limits of said selected range, said transmitting transducer having a response time large relative to the frequency return time of said first multivibrator, means to apply the output of said first multivibrator to said transmitting transducer to produce corresponding acoustic energy in said zone, a receiving transducer exposed to said zone and having a resonant frequency, bandwidth and response time substantially equal to the resonant frequency, bandwidth and response time, respectively, of said transmitting transducer, a portion of said acoustic energy transmitted into said zone being reflected from an object in said zone and being converted into a received signal by said receiving transducer, a transistor, means to apply a portion of the output of said first multivibrator to said transistor, the amplitude of said portion being selected alternately to drive said transistor to conduction and nonconduction, means to apply said received signal to said transistor, means to derive a mixed frequency output from said transistor, means to suppress frequency components other than the difference frequency between said portion and said received signal, means to amplify said difference frequency components, sound reproducing means, and means to apply said amplified difference frequency components to said sound reproducing means.

6. Apparatus as set forth in claim 5, comprising a spectacle frame having lens openings, said transmitting and receiving transducers each being mounted in a respective lens opening.

7. Apparatus as set forth in claim 6, comprising means to limit to about 20° the horizontal included angle in which acoustic energy is transmitted by said transmitting transducer.

References Cited by the Examiner

UNITED STATES PATENTS

| 1,945,814 | 2/1934 | Kolozsy | 329—50 |
| 2,474,918 | 7/1949 | Slaymaker et al. | 340—16 |
| 2,567,407 | 9/1951 | Slaymaker | 340—16 |
| 2,574,596 | 11/1951 | Slaymaker | 340—16 |
| 2,659,878 | 11/1953 | Meeker et al. | 340—16 |
| 3,009,111 | 11/1961 | Rhodes | 329—50 |
| 3,031,628 | 4/1962 | Bickel | 331—113 |
| 3,039,066 | 6/1962 | Kenny | 311—113 |

BENJAMIN A. BORCHELT, *Primary Examiner.*

NEIL C. READ, *Examiner.*

R. M. GOLDMAN, P. A. SHANLEY,
*Assistant Examiners.*